United States Patent [19]

Griffen et al.

[11] Patent Number: 5,293,125
[45] Date of Patent: Mar. 8, 1994

[54] SELF-ALIGNING TACHOMETER WITH INTERCHANGEABLE ELEMENTS FOR DIFFERENT RESOLUTION OUTPUTS

[75] Inventors: Neil C. Griffen; Richard S. Stokes; Joseph F. Bioty, all of Westerville, Ohio

[73] Assignee: Lake Shore Cryotronics, Inc., Westerville, Ohio

[21] Appl. No.: 822,016

[22] Filed: Jan. 17, 1992

[51] Int. Cl.$^5$ .................. G01P 3/487; H02K 11/00
[52] U.S. Cl. .................. 324/173; 310/68 B; 324/207.21; 324/174; 324/252
[58] Field of Search .............. 324/160, 163, 166, 173, 324/174, 207.20, 207.21, 207.22, 207.25, 252; 310/68 B, 48, 66; 340/671; 73/518, 660, 661, 861.78; 341/15

[56] References Cited

U.S. PATENT DOCUMENTS

| | | |
|---|---|---|
| 4,42,496 | 2/1987 | Kerviel et al. ............ 310/68 B |
| 3,058,339 | 10/1962 | Shapiro .................... 73/660 |
| 3,143,882 | 8/1964 | Brueckner ............... 73/861.78 |
| 3,636,767 | 1/1972 | Duffy ..................... 324/174 X |
| 3,764,888 | 10/1973 | Anderson ................... 322/20 |
| 3,997,782 | 12/1976 | Willits ..................... 250/231 |
| 4,274,053 | 6/1981 | Ito et al. ................... 24/174 |
| 4,319,188 | 3/1982 | Ito et al. ................... 324/173 |
| 4,350,952 | 9/1982 | Holt et al. ................. 324/166 |
| 4,418,372 | 11/1983 | Hayashida et al. ......... 360/113 |
| 4,506,217 | 3/1985 | Rothley et al. ............ 324/208 |
| 4,639,807 | 1/1987 | Sekizawa et al. .......... 360/113 |
| 4,656,377 | 4/1987 | Akiyama et al. ........... 310/68 |
| 4,668,913 | 5/1987 | Vinal ....................... 324/208 |
| 4,686,472 | 8/1987 | Van Ooijen et al. ........ 324/252 |
| 4,712,064 | 12/1987 | Eckardt et al. ............ 324/208 |
| 4,742,297 | 5/1988 | Heaton et al. ............. 324/166 |
| 4,766,376 | 8/1988 | Takahashi et al. .......... 324/208 |
| 4,786,870 | 11/1988 | Kawamata et al. ......... 324/208 |
| 4,800,457 | 1/1989 | Kryder et al. .............. 36/113 |
| 4,816,948 | 3/1989 | Kamo et al. ............... 360/113 |
| 4,818,939 | 4/1989 | Takahashi et al. .......... 324/208 |
| 4,851,771 | 7/1989 | Ikeda et al. ............... 324/208 |
| 4,853,631 | 8/1989 | Carmen .................... 324/208 |
| 4,853,632 | 8/1989 | Nagano et al. ............. 324/208 |
| 4,857,841 | 8/1989 | Hastings et al. ........... 324/208 |
| 4,866,382 | 9/1989 | Carmen .................... 324/208 |
| 4,874,053 | 10/1989 | Kimura et al. ............. 180/79.1 |
| 4,890,059 | 12/1989 | Guentner .................. 324/174 |
| 4,907,445 | 3/1990 | Okumura .................. 324/174 X |
| 4,914,387 | 4/1990 | Santos ..................... 324/166 |
| 4,914,389 | 4/1990 | Juds ........................ 324/207 |
| 4,922,197 | 5/1990 | Juds et al. ................ 324/207 |
| 4,975,675 | 12/1990 | Becker ..................... 338/32 R |
| 4,988,220 | 1/1991 | Christiansen et al. ....... 384/448 |
| 4,992,733 | 2/1991 | Griebeler .................. 324/207 |
| 5,019,776 | 5/1991 | Kawamata et al. ......... 324/207 |
| 5,041,784 | 8/1991 | Griebeler .................. 324/207 |
| 5,081,416 | 1/1992 | La Croix ................... 324/173 |

OTHER PUBLICATIONS

Wehmer, B. F. Electromagnetic Tachometer, IBM Tech. Discl. Bull. vol. 11 No. 7 Dec. 1968 pp. 746, 747.

Primary Examiner—Gerard R. Strecker
Attorney, Agent, or Firm—Nixon & Vanderhye

[57] ABSTRACT

A tachometer for monitoring the rotation of an output shaft (e.g. of a motor, where the motor is enclosed within a standard NEMA housing), includes an enclosure (e.g. adapted to be secured to an end plate of the motor housing), the enclosure having a radial center and a longitudinal axis which, when the enclosure is secured to the housing, are aligned with a longitudinal axis of the output shaft. The enclosure has at least one mounting surface in a peripheral wall portion thereof, the mounting surface having an aperture formed therein which opens in a radial direction. A sensor module including a pair of axially aligned magneto-resistive sensors is mountable on the mounting surface of the enclosure such that the module protrudes through the aperture with the sensors facing radially inwardly. An annular drum having a pair of magnetic patterns arranged on a peripheral end surface thereof is operatively fixed on the motor output shaft via a hub member such that the magnetic patterns on the drum are automatically aligned with the sensors and radially spaced therefrom by a predetermined radial gap when the drum is fixed to the output shaft and the enclosure is mounted on the end plate in an operatively assembled relationship.

23 Claims, 10 Drawing Sheets

SELF-ALIGNING TACHOMETER WITH INTERCHANGEABLE ELEMENTS FOR DIFFERENT RESOLUTION OUTPUTS

FIELD OF THE INVENTION

The present invention relates to techniques for monitoring parameters of a rotating shaft. More particularly, the present invention relates to a tachometer providing interchangeable elements so as to provide different resolution outputs, and to a tachometer using a magneto-resistive sensor arrangement for monitoring shaft rotation. Still more particularly, the present invention relates to a tachometer adaptable to couple with the face plate of a standard electric motor for producing electrical output signals indicating the speed and direction of motor shaft rotation.

BACKGROUND AND SUMMARY OF THE INVENTION

The low-resolution tachometers currently available for use on Industry Standard Frame Size AC and DC motors generally consist of a magnet biased sensor magnetically coupled to a metal gear-toothed wheel (the wheel being fastened to rotate with the DC motor output shaft). Varying pulse counts of 60, 120 and 240 pulses per revolution ("PPR") are typically obtained by providing an appropriate number of teeth on the gear-toothed wheel. Such arrangements are useful in certain low-resolution applications, but have several disadvantages in other applications.

One major disadvantage of such standard low resolution tachometers is that different wheels must be provided for different pulse counts. This means that the manufacturer must make (and inventory) several different types of toothed wheels having different numbers of teeth; and that original equipment manufacturers must keep a stock of the various different wheel types in inventory. Thus, the use of different types of wheels for different resolutions and applications increases design, manufacturing and inventory costs.

In addition, the resolution of such prior art low resolution arrangements as currently limited to about 240 pulses per revolution ("PPR"). This is because the upper limit on pulse count is a function of how many teeth can accurately be placed on the wheel; and on the ability of the sensor to differentiate between the teeth. Mechanical durability and machining tolerances limit the number of teeth that can be placed on the wheel. Moreover, speed variations, the size of the magnetic sensor, and other factors require a minimum spacing between teeth to ensure that each tooth is detected.

A further disadvantage of prior art arrangements is that an auxiliary sensor is required to provide directional information. This auxiliary sensor must be mechanically positioned so that a "quadrature" signal is obtained. Such a quadrature signal typically provides two pulse signals that are 90 degrees out of phase with respect to one another, and thus permit digital circuitry to accurately derive higher resolution outputs therefrom. Quadrature signals are commonly provided by conventional shaft encoders. Moreover, there are known methods for scaling the timing of such quadrature signals while maintaining the scaled output signals in quadrature. For example, it is known to pass quadrature signals through an Exclusive OR logic function to provide a frequency doubling effect. As another example, DynaPar manufactures a "divide by four" electrical module that accepts quadrature input signals in quadrature and scales those input signals by a "divide by 4" operation to provided scaled quadrature output signals. One technique used in the past for scaling of quadrature output signals is to synthesize quadrature output waveforms using an EEPROM lookup table.

It is generally known to use magneto-resistive sensor assemblies to ascertain shaft rotation parameters. The following is a non-exhaustive but somewhat representative list of prior patents relating to magneto-resistive sensor assemblies:

U.S. Pat. No. 4,656,377 to Akiyama et al;
U.S. Pat. No. 4,866,382 to Carmen;
U.S. Pat. No. 4,853,631 to Carmen;
U.S. Pat. No. 4,851,771 to Ikeda et al;
U.S. Pat. No. 4,274,053 to Ito et al;
U.S. Pat. No. 4,319,188 to Ito et al;
U.S. Pat. No. 5,019,776 to Kawamata et al;
U.S. Pat. No. 4,786,870 to Kawamata et al;
U.S. Pat. No. 4,853,632 to Nagano et al;
U.S. Pat. No. 4,639,807 to Sekizawa et al;
U.S. Pat. No. 4,766,376 to Takahashi et al;
U.S. Pat. No. 4,818,939 to Takahashi et al;

Carmen '382 teaches a magneto-resistive element array which is selectively connected to accommodate a number of different diameter encoder wheels each containing a different number of pieces of magnetic information (e.g., ranging from 100 to 512 poles). Output signals are provided in quadrature to increase the resolution of the system (e.g., to provide a frequency equal to four times the pulse count, e.g., 400 to 2048 PPR). Comparators are used to generate output pulses. The system senses the number of rotations (i.e., using an index mark on a further circumferential track) in addition to incremental movement of the encoding wheel. See also Carmen '631, which teaches bridging magneto-resistive sensor outputs to sense information recorded at different frequencies.

Ito et al '053 and Ito et al '188 relate to multitrack magnetic rotary encoders for use in determining the rotating conditions of a rotatable shaft. Encoders are described for mounting on the face plate of an electric motor (see FIG. 17 of Ito '053, and FIG. 19 of the Ito '188 patent). Different sensor array configurations are used to provide different phased signals. An integrated circuit rotary position detector 14 is disclosed in the '188 patent as disposed within a face plate sensor housing. Both analog and BCD output signals are provided.

Nagano et al teaches a magneto-resistive sensor for determining position of a motor shaft. A gear-shaped disk of magnetic material is fixed to a hub, and the hub is mounted to the shaft of a motor (see FIG. 1). The hub and disk are mounted within an enclosure on the motor face plate. A pair of magneto-resistive elements 7 and associated signal processing integrated circuit are mounted on an insulating substrate within the enclosure. The signal processing circuitry includes a waveform shaping circuit having a comparator.

Ikeda et al teaches various embodiments of magneto-resistive encoders and associated sensors for determining speed and position. Their disclosure is directed to the orientation between a magneto-resistive "stripe" relative to magnetic patterns disposed on an encoding drum. Multiple tracks and multiple sensors provide speed and displacement information.

Akiyama et al teaches using dual magneto-resistive sensors for determining direction.

Kawamata et al '776 and Kawamata et al '870 relate to multitrack magneto-resistive position detectors. These patents disclose different magneto-resistive element configurations and connections to provide proper combinations of the multi-track signals.

Sekizawa et al teaches a magneto-resistive speed detector including an array of magneto-resistive elements connected in a bridge circuit.

Takahashi et al '939 discloses a rotating drum type magneto-resistive speed sensor arrangement providing multiple sensing elements that provide associated differently phased output signals. Such output signals are combined to provide position information. Takahashi et al '376 discloses a multitrack drum coupled to a motor output shaft to provide an absolute position detector. Voltage comparators and combinatorial logic elements are used to provide position signals based on multiphase input signals from the magneto-resistive sensor elements.

The following additional references disclose various features of shaft sensors (not in the context of magneto-resistive type sensors, however):

U.S. Pat. No. 3,764,888 to Anderson;
U.S. Pat. No. 4,988,220 to Christiansen et al;
U.S. Pat. No. 4,890,059 to Guentner;
U.S. Pat. No. 3,997,782 to Willits.

Christiansen et al teaches a wheel speed sensor assembly that can be partially disassembled without exposing the wheel bearing.

Guentner teaches a non-contacting digital tachometer including wire pulse sensors separated from a magnetized drum surface by an air gap. Two adjusting holes are aligned with the air gap to permit the legs of an adjusting yoke to be inserted and establish the air gap between the sensors and the wheel.

Willits teaches a photoelectric rotary pulse transducer including a cylindrical housing.

Anderson teaches a direct current teachometer system which provides a DC output having a magnitude which varies with tachometer speed. Reference pulses are generated exhibiting a frequency proportional to tachometer speed. A control circuit varies the magnitude of the DC output signal in dependence on the frequency of the reference pulses.

The following additional references relate generally to magneto-resistive sensing techniques:

U.S. Pat. No. 4,992,733 to Griebeler;
U.S. Pat. No. 5,041,784 to Griebeler;
U.S. Pat. No. 4,857,841 to Hastings et al;
U.S. Pat. No. 4,914,389 to Juds;
U.S. Pat. No. 4,922,197 to Juds et al;
U.S. Pat. No. 4,816,948 to Kamo et al;
U.S. Pat. No. 4,874,053 to Kimura et al;
U.S. Pat. No. 4,914,387 to Santos;
U.S. Pat. No. 4,668,913 to Vinal. Griebeler '733 and Griebeler '784 teach transducers for use in measuring the parameters of a linearly moving ram within a die casting machine.

Hastings teaches a magneto-resistive proximity sensor.

Juds '389 teaches a multi-turn shaft position sensor. Juds et al '197 teaches a high resolution proximity detector.

Kamo et al teaches a way to magnetize a magneto-resistive film.

Kimura et al teaches magneto-resistive torque (shaft torsion measuring) sensors with various signal processing arrangements (including some software based signal processing algorithms).

Santos teaches a magneto-resistive speed sensor that adapts to changes due to aging, ambient magnetic field, etc.

Vinal teaches a constant flux magneto-resistive magnetic reluctance sensor for reading magnetic ink characters.

The following references relate to magneto-resistive probe assemblies per se:

U.S. Pat. No. 4,975,675 to Becker;
U.S. Pat. No. 4,712,064 to Eckhardt et al;
U.S. Pat. No. 4,418,372 to Hayashida et al;
U.S. Pat. No. 4,800,457 to Kryder et al;
U.S. Pat. No. 4,506,217 to Rothley et al;
U.S. Pat. No. 4,686,472 to Van Ooijen et al.

Hence, much work has been done in the past in the area of tachometers in general and magneto-resistive tachometers in particular. However, further improvements are possible.

The present invention provides a new type of tachometer that overcomes the problems discussed above and other problems as well.

Briefly, the preferred embodiment "Magnetic Incremental Encoder" magneto-resistive sensor arrangement provided by the present invention utilizes a non-magnetically biased magneto-resistive sensor element; a magnetized drum; and associated integrated circuit based electronics. More specifically, the sensor arrangement includes an enclosure, a drum, a magneto-resistive probe, a hub, and an electronics module. The generally cylindrical enclosure is bolted onto the end plate of a motor casing or housing (e.g., a standard NEMA 4.5 inch and 8.5 inch C-Face end plate of an AC or DC electric motor). The enclosure provides a circular opening for the motor shaft to protrude through. In one exemplary embodiment, the hub is fastened to the end face of the motor shaft, and a magneto-resistive drum is fastened to the hub. The drum includes two magnetized tracks: an incremental magnetic ("INC") track and an index pulse ("Z") track. Such magnetized tracks are formed in a conventional manner by magnetizing the periphery of the drum. The "Z" track encodes one pattern (pulse) per revolution, while the "INC" track encodes (in the preferred embodiment) 480 patterns (pulses) per revolution.

The enclosure is formed with at least one, and preferably a pair of planar saddle surfaces, each having a rectangular opening therethrough. In one exemplary embodiment, a generally rectangular sensor housing or module is detachably fastened to the saddle surface and protrudes radially through the rectangular opening into the interior of the enclosure. The sensor housing supports a two track magneto-resistive probe at a free end thereof for sensing the "INC" track and the "Z" track, respectively. The preferred embodiment probe comprises a conventional magneto-resistive sensing element(s) and a miniature PC board providing signal processing circuitry.

The mounting arrangement between the enclosure and motor end plate, the enclosure and the sensor module, and the motor shaft and hub/drum provides a self-gapping probe-to-drum spacing of approximately 0.020 plus or minus 0.009 inches, and provides for self-alignment (axially and radially) between the probe and the drum. Thus, one significant innovation of the preferred embodiment design is that the magnetic drum and mounting hub, enclosure, and sensor module can be assembled onto a motor housing and put into operation without extensive alignment procedures. In other words, after the magnetic drum and hub have been fitted to the end face of the motor shaft and bolted in place, the enclosure is then bolted into place on the motor housing end plate. Finally, the sensor module is slipped into the radial opening in the enclosure and bolted into place on the saddle surface. The wires are connected and the tachometer as ready to operate, with no special adjustment of the location of the probe or sensor module required. With this configuration, the probe is removable and replaceable with another probe without any realignment of the assembly. This feature is advantageous for both assembly and service repair.

Such self-alignment and self-gapping is possible because electric motors are generally produced in accordance with NEMA standards which set the dimensions and tolerances of standard motor facings and shaft sizes. The preferred embodiment enclosure is machined to fit onto NEMA C type motor faces to a tight tolerance. The sensor module saddle mounting surface is also machined on the side of the enclosure to a tight tolerance with respect to the holding rim or lip of the enclosure which interfaces with the motor end plate. By holding these tight tolerances, as well as tight tolerances on the depth of the sensor from the mating surface of the probe to the surface of the sensor, the sensor can be located at a very precise distance from the center-line of the motor shaft.

In a like manner, the hub which is used to hold the magnetic drum onto the motor shaft is also machined to high tolerances. In one exemplary embodiment, the hub has a recess which fits over the end of the motor shaft. The recess is concentric to the center-line or axis of the shaft and to the outer diameter of the hub. Onto this the drum is centered with respect to the outer diameter of the hub and held in place by screws or other suitable means (e.g., structural adhesive). The outer diameter of the drum is also machined to a tight tolerance. The depth of the hub recess determines the longitudinal location of the drum with respect to the sensor, and therefore, this depth is also tightly controlled.

In this configuration, the drum and sensor can be precisely located with respect to each other, across a radial gap. The tolerance of the gap between the sensor and drum edge is a function of the dimensional tolerances of the individual parts. According to the NEMA standards for one application, for example, the critical dimensions of the motor facing eccentricity is four thousands of an inch TIR (0.004"). The TIR of the shaft is three thousands of an inch (0.003"). The machining tolerances of the enclosure, probe and hub can be held to a few thousands of an inch or less. By using the tight machining tolerances as described above, the tolerance of the radial gap can be kept to plus-or-minus ten thousands of an inch (+/−0.010") or better.

Other physical arrangements in different motor applications are within the scope of this invention. For example, for those motors which have relatively longer output shafts (which may be connected at their free end to a driven element for example), the enclosure is provided with an aperture to allow the motor shaft to extend therethrough. In addition, the above described hub is replaced by a sleeve type hub which may be located axially along the shaft and set at a precise distance from the motor end plate. Otherwise, the sleeve type hub functions much in the same manner as the first described hub in that a magnetic drum is fixed thereto for precise orientation vis-a-vis the magnetic probe.

In still another exemplary embodiment, a hub is provided for a motor output shaft end as in the first described embodiment, but with the further provision for some small axial adjustment relative to the end surface of the shaft using fine thread set screws. This is to accommodate any axial run-out of the shaft relative to the motor beyond the stated tolerance.

In the preferred embodiment, the sensor module and probe includes associated electronics which provides a square wave pulse train for use in position and velocity feedback and control applications. The sensor arrangement in accordance with one exemplary embodiment can produce pulse counts of 60, 64, 75, 120, 128, 150, 240, 256, 300, 480, 512, 600, 960, 1024 and 1200 pulses per revolution (the pulse count being set via jumpers coupled to the electronics module). The matched magneto-resistive sensor and drum provide a "raw" pulse count of a nominal frequency (e.g., 480, 512 or 600 PPR) dependent on the magnetic pattern provided on the magnetized drum. In order to generate quadrature maintained pulse counts, a low power programmable logic device is used to divide-by-n the "raw" output frequency to provide derived pulse counts in quadrature maintained form.

Briefly, a programmable asynchronous state machine is used to selectively divide by 2, 4 or 8 while maintaining quadrature. Base logic divides by a certain factor (e.g., by 2 to yield 240). Further divisions are used to obtain the desired pulse rate. Jumpers specify the factor of n in the presently preferred embodiment (programming can be accomplished by routing the appropriate set of signals to the output drivers via jumpers at the time of order). The preferred embodiment system provides a differential output, with the following output phases: A phase, B phase 90° phase gap relative to phase A (when A phase leads B phase, the monitored rotation is clockwise); and Z phase. Such outputs are provided at a rugged, environmentally sealed connector on the top of the sensor holding in the preferred embodiment.

The preferred embodiment sensor provided by the present invention thus provides a two-channel incremental quadrature output as well as a once-per-revolution index or marker pulse. A common drum (and common electronic circuitry) is used for multiple pulse counts of a single divisor. In other words, one drum encoding 480 pulses per revolution as a "raw" pulse count, can be used to obtain incremental pulse output rates of 480, 240, 120 or 60 pulses per revolution; a drum encoding 512 pulses can be used to obtain incremental pulse output rates of 512, 256, 128 and 64 pulses per revolution; and a drum encoding 600 pulses per revolution can be used to obtain incremental pulse ratio of 600, 300, 150 and 75 pulses per revolution.

It will be appreciated that different drums are required for encoding 480, 512 and 600 pulses because, in order to maintain the same pitch pattern, the diameters of the respective drums must necessarily change. In addition, in order to maintain the same radial gap for each drum/sensor combination, it is necessary to provide a precisely machined spacer for insertion between the common sensor module and the saddle surface of the enclosure. Thus, if the enclosure, sensor module and drum are calibrated on the basis of a 480 pulse drum, no spacer is required. For the 512 and 600 pulse drums, however, a spacer would be required for each, as determined by the respective diameter increases over the 480 pulse drum. In this way, a common sensor module may be used with any of the above described drums.

Even with the few additional parts described above, the invention nevertheless provides a considerable reduction in inventory otherwise required to provide the wide range of pulse count options possible with this invention (e.g., the manufacturer needs to estimate only the total number of sensors, drums and spacers that will have to be delivered, and does not have to worry about anticipating what particular pulse counts customers will require). The electronics/sensor package is easily separable from the mounting enclosure so that field adjustment and/or replacement can be performed without removal of the sensor enclosure. No electrical adjustments or alignment are required by the installer, and the sensor assembly is self-gapping and self-aligning. Programmable divide-by-n and/or multiply-by-n circuitry within the magneto-resistive tachometer housing permit a common drum and sensor to be used to provide different pulse counts.

BRIEF DESCRIPTION OF THE DRAWINGS

These and other features and advantages provided by the present invention may be better and more readily understood by referring to the following detailed description of presently preferred exemplary embodiments in conjunction with the drawings, of which.

DETAILED DESCRIPTION OF THE DRAWINGS

Figure 1:
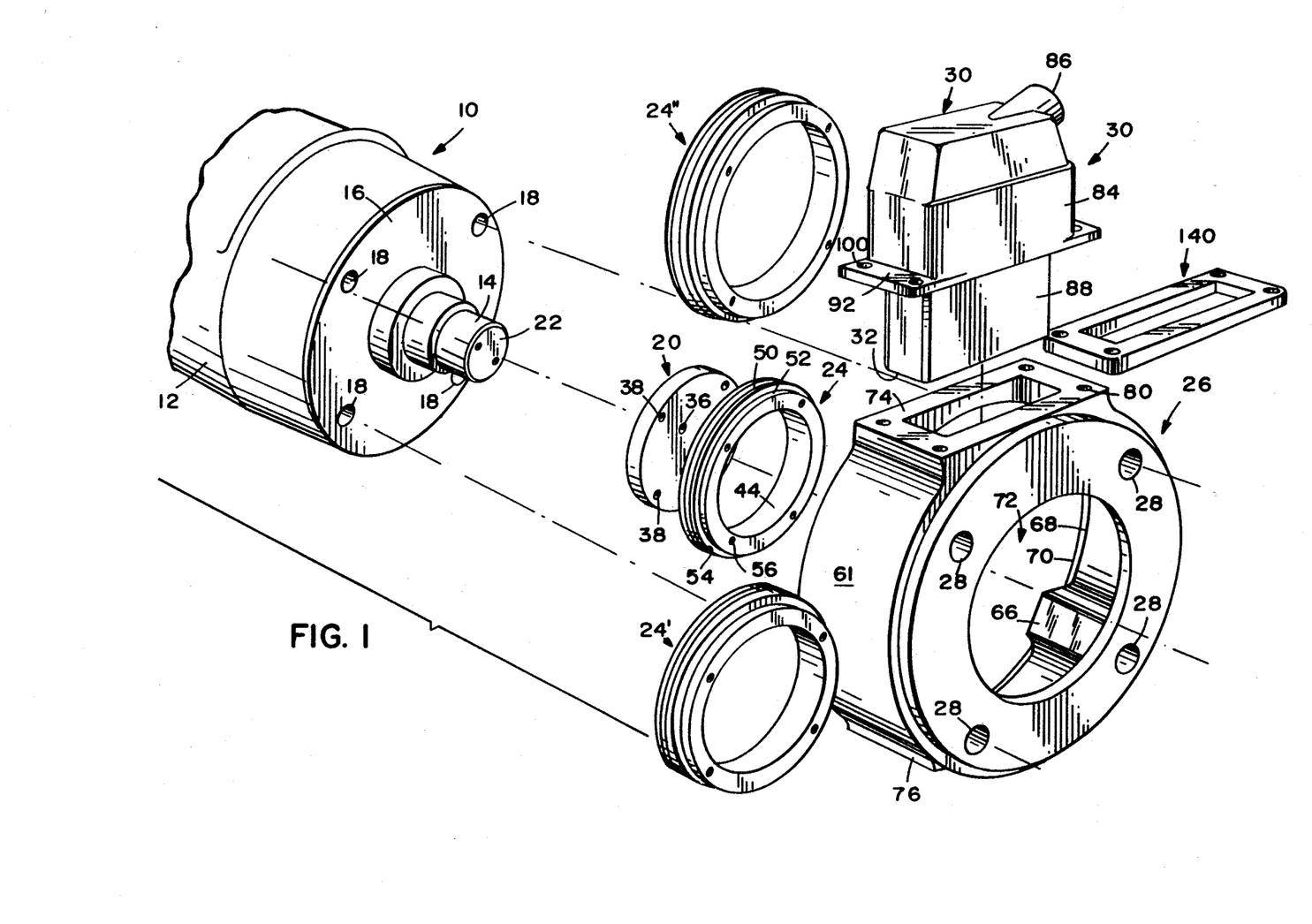
FIG. 1 is an exploded perspective view of the tachometer enclosure and magneto-resistive sensor and associated motor with alternative drums and an associated spacer also illustrated.

With reference to FIG. 1, a motor and tachometer assembly in accordance with the invention is illustrated in exploded form, and generally includes a motor 10 having a casing or housing 12 (a NEMA-C standard casing, for example) and an output shaft 14 extending beyond an end plate 16 of the casing. The latter is provided with four bolt holes 18 which enable the end plate to be secured to the remainder of the casing 12.

The tachometer assembly itself includes a hub 20 adapted to be bolted to the end face 22 of the shaft 14. A magnetic drum 24 is securable to the hub 20 and, as will be explained below, the size, i.e., diameter of the drum, will depend on the selected raw or nominal pulse count. When the hub 20 and drum 24 are secured to the shaft 14, they are concentric with each other and with the longitudinal axis of the shaft 12.

A shroud or enclosure 26 is mountable to the end plate 16 of the casing 12, using the bolt holes 18 which are aligned with corresponding holes 28 in the enclosure. In the event the end plate 18 is integral with housing 12, new holes would be provided to facilitate the attachment of the enclosure.

A sensor module 30 is securable to the enclosure 26 such that probes (described below) on an end face 32 of the module are aligned with magnetic patterns or tracks provided on the peripheral surface of the drum as described in greater detail below.

The individual components of the tachometer described in general terms above, will now be described in detail.

Figure 2:
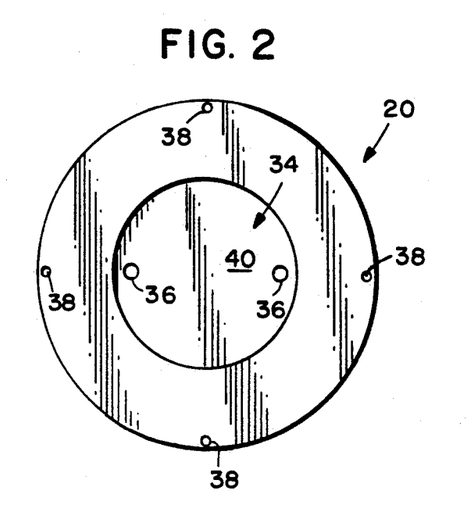
FIG. 2 is an end view of the hub illustrated in FIG. 1.
Figure 3:
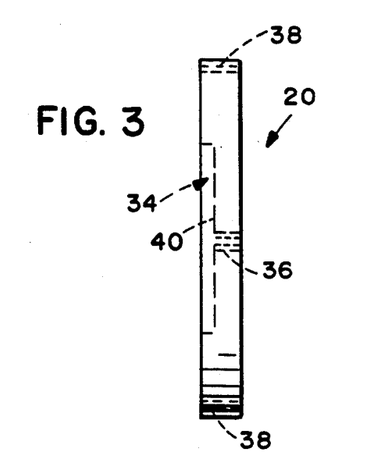
FIG. 3 is a side elevation of the hub illustrated in FIG. 2.

In FIGS. 2 and 3, the hub 20 is illustrated and comprises a solid, annular member having a centrally located annular metal (and concentric) recess 34 with a pair of mounting holes 36 within the recess and extending through the hub. The hub is also provided with four peripherally spaced, threaded screw holes 38 for mounting the drum 24. This exemplary hub 20 is attached directly to the end face 22 of the shaft 14 by means of screws (not shown) extending through holes 36 and into the end face 22, so that the end face 22 is received within the recess 34 and in abutting relationship with the interior (rear) surface 40 of the recess. It will be appreciated that in this embodiment, the shaft 14 is relatively short, and is not connected to any driven component.

Figure 4:
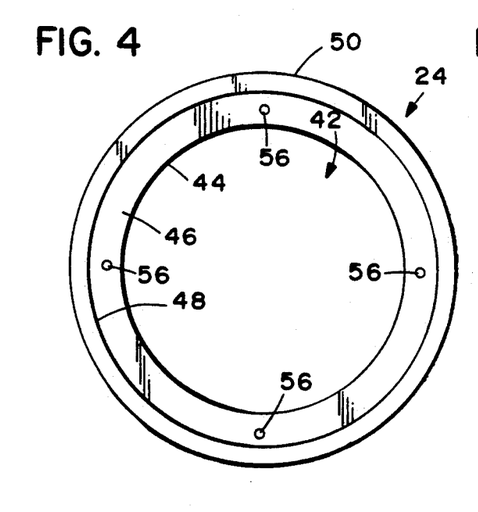
FIG. 4 is an end view of a magnetic drum of the type shown in FIG. 1.
Figure 5:
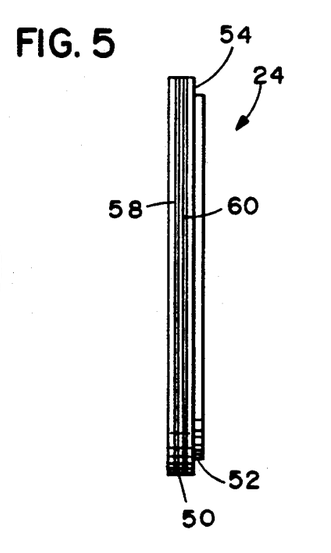
FIG. 5 is a side elevation of the drum illustrated in FIG. 4.

With reference to FIGS. 4 and 5, the drum 24 in this exemplary embodiment comprises an annular ring having a central aperture 42 defined by a first annular surface 44. A shoulder or recessed seating surface 46 extends between annular surface 44 and a second annular surface 48. The outer periphery of the ring 24 is also defined by a pair of diametrical surfaces 50, 52 connected by a radial step 54. The shoulder 46 as formed with a plurality of circumferentially spaced screw holes 56, and as explained above with respect to FIG. 1, the hub 20 and drum 24 may be secured together, with the hub 20 seated on the shoulder or seating surface 46 and secured by screws via aligned holes 38 and 56. In a typical installation, the hub and drum would be secured together and then the assembled unit fixed to the shaft end face 22. The peripheral surface 50 of the drum is provided with magnetic patterns 58 and 60 which are arranged in two peripheral "tracks", one axially spaced from the other across the axial thickness or extent of surface 50. These are the "INC" and "Z" tracks discussed above.

Figure 6:
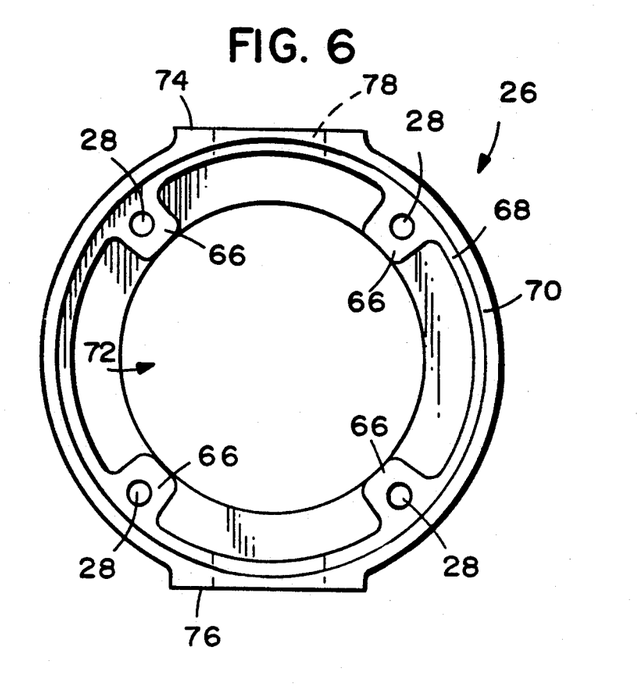
FIG. 6 is an end view of the enclosure illustrated in FIG. 1.
Figure 7:
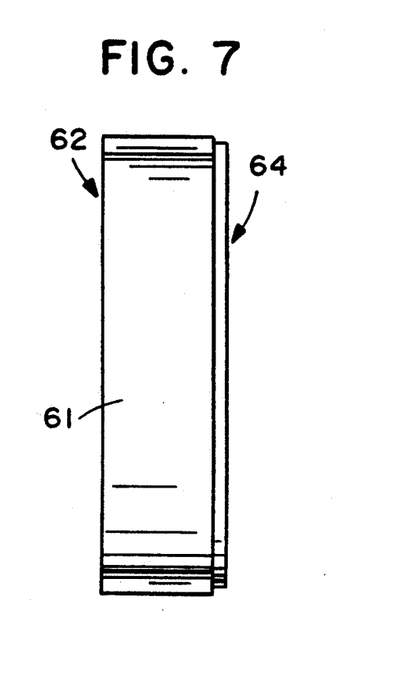
FIG. 7 is a side elevation of the enclosure illustrated in FIG. 6.
Figure 8:
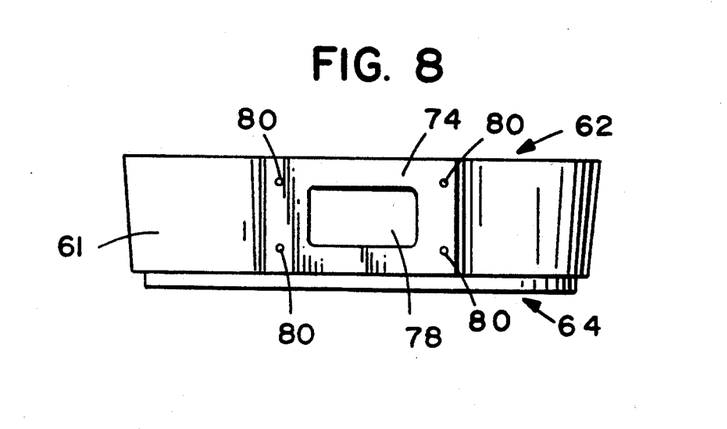
FIG. 8 is a top plan view of the enclosure illustrated in FIG. 6.

With reference now to FIGS. 1 and 6, the enclosure 26 is a generally cylindrical member preferably ductile iron casting, and having a peripheral side wall 61, which may be slightly tapered in an inward direction between an open end 62 and a partially closed end 64. The interior of the closure is formed with four radially inwardly extending, and equally spaced bosses 66, through which the axial bores or through-holes 28 extend. Bosses 66 lie flush with an annular seating surface 68 which is axially offset from the end surface 70 of the enclosure. The recessed seating surface 68 will receive and engage the motor casing end plate 16 of the motor 10, and screws or bolts (not shown) will secure the enclosure 26 to the end plate.

The partially closed end 64 of the enclosure is formed with a central aperture 72 which permits longer motor shafts to extend beyond the enclosure as will be explained below in conjunction with other exemplary embodiments.

The enclosure 26 is also formed with diametrically opposed, flat saddle surfaces 74, 76 which are identical, so that only one need be described further. Saddle surface 74 surrounds a substantially rectangular radial opening 78 which permits radial access to the interior of the enclosure. Surface 74 is also provided with four screw holes 80 which enable the sensor module 30 to be secured thereto as described below. It will be appreciated that surface 74, 76 are machined horizontal, i.e., parallel to the motor shaft axis and perpendicular to a longitudinal axis of the sensor module 30, whether or not the side wall 61 is tapered.

The additional saddle surface 76 provides an optional mounting location for the sensor module 30, depending on space available in any particular motor environment. The additional saddle surface also permits the use of two sensor modules 30 for simultaneous monitoring of the motor shaft rotation, as described further herein. Alternatively, the enclosure may be sized to permit mounting of two or more axially aligned sensor modules. In other words, the saddle surface 74 (and/or 76) may be axially lengthened to permit a pair of axially aligned openings 78 to be formed therein, thereby permitting the mounting of additional sensor modules.

Figure 9:
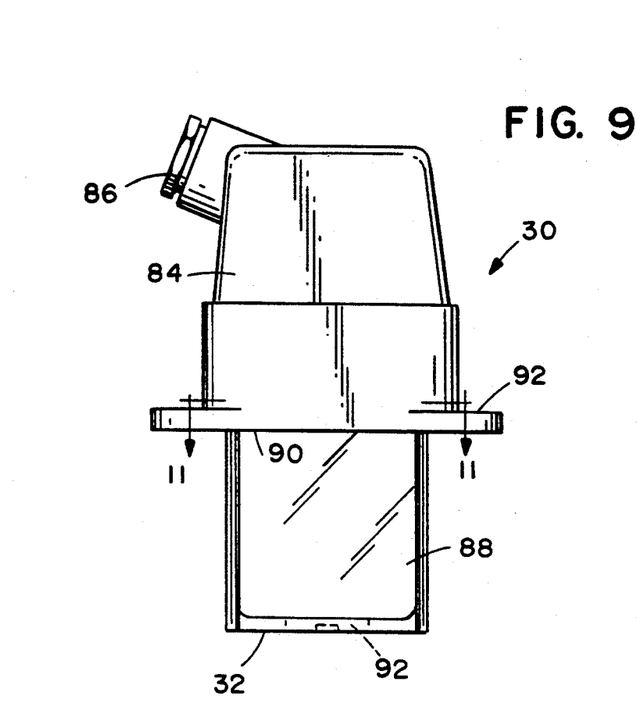
FIG. 9 is a side view of a magnetic sensor of the type illustrated in FIG. 1.
Figure 10:
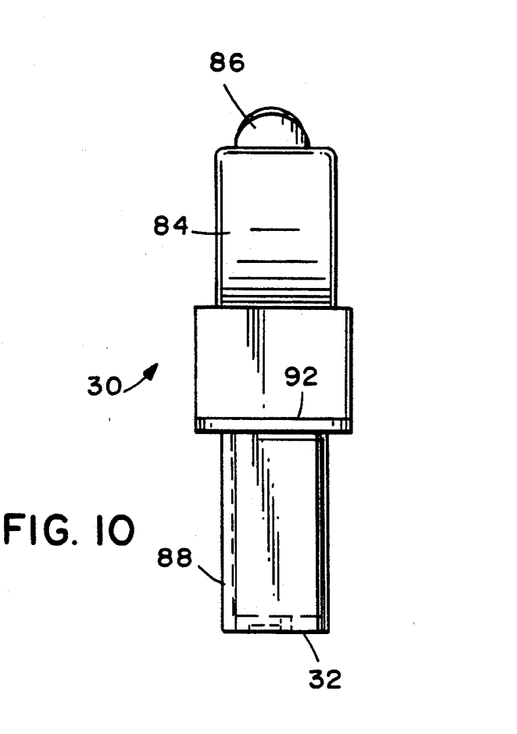
FIG. 10 is an end view of the sensor illustrated in FIG. 9.
Figure 11:
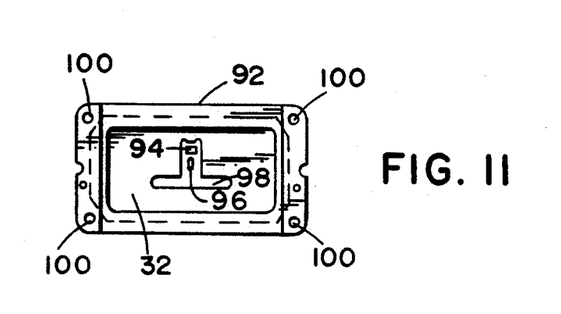
FIG. 11 is a section taken along the line 11—11 in FIG. 9 with internal electronics removed for clarity.

With reference now to FIGS. 9–11, the sensor module 30 includes an upper housing portion 84 provided with a wire cable inlet or connector 86, and a lower probe portion 88 which is received within a shallow recess (not shown) in the end face 90 of the housing portion 84 and secured thereto by any appropriate means. The end face 90 of the housing portion 84 extends outwardly from the remaining area of the housing to form a mounting flange 92 which as adapted to seat on the saddle surface 74, with the probe portion 88 extending radially into the enclosure 26 to a carefully preselected position vis-a-vis the peripheral surface 50 of the drum.

With specific reference to FIG. 11, the end face 32 of the probe portion 84 exposes a pair of sensors or probes 94 and 96 embedded in a resin material 98.

The flange 92 is formed with four mounting holes 100 which allow the sensor module to be seated on saddle surface 74 and fixed in place by screws (not shown) extending through-holes 100 and into holes 80 in the enclosure saddle surface 74.

When the enclosure, sensor module, hub and drum components (manufactured to the required tolerances described above) are fully assembled, sensors 94, 96 will be axially aligned with the respective tracks 58, 60 on the surface 50, and separated by a predetermined radial gap of (in the exemplary embodiment) 0.020 in. with a tolerance of ±0.009 in.

Prior to discussing the sensors 94, 96 and magnetic tracks 58, 60 in detail, other physical arrangements of the various components will be described.

As already noted above, the first described embodiment is intended to be used in those circumstances where the motor shaft 14 is relatively short, and not connected to (or in driving relationship with) any other component. It will be appreciated, however, that other circumstances dictate that the tachometer assembly be used even if the motor shaft mounts a gear or other drive element at its free end. In such situations, the shaft 14 will be long enough to extend through the enclosure 26 via aperture 72, but the shaft end face will be unavailable as a mounting location for the hub and drum assembly.

Figure 12:
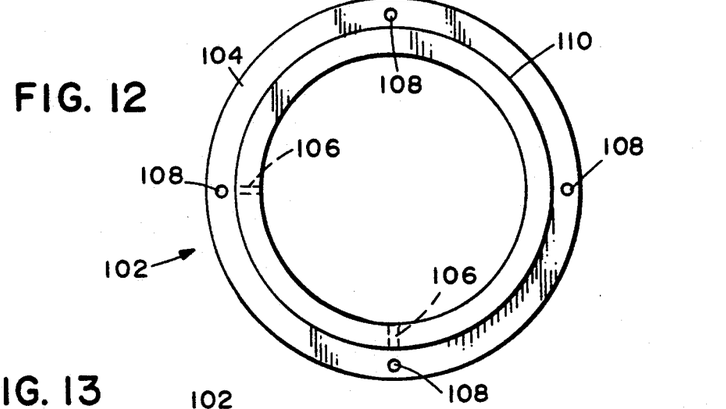
FIG. 12 is an end view of a hub in accordance with a second exemplary embodiment of the invention.
Figure 13:
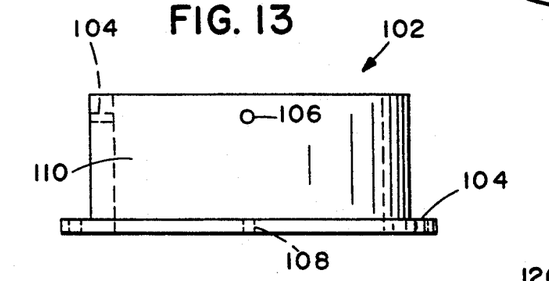
FIG. 13 is a top plan view of the hub illustrated in FIG. 12.

In FIGS. 12 and 13, an alternative hub 102 is shown which is in the form of an open-ended substantially cylindrical sleeve with a radial flange 104 at one end. The interior diameter of the sleeve hub is sized to slide over the motor shaft, where it can be fixed by means of set screws (not shown) extending through radial screw holes 106. Screw holes 108 spaced about the flange 104 enable a drum (such as drum 24) to be secured to the hub, seated on exterior peripheral surface 110 and abutting the flange 104. The sleeve hub 102 and associated drum 24 can then be fixed to the motor shaft at the precise axial distance from motor end plate 16 to insure alignment of the magnetic tracks 58, 60 on the drum 24 and the sensors 94, 96 in the sensor module 30. In this way, the motor shaft 14 can extend axially beyond the enclosure 24 and can be operatively connected to other machine elements without interference from the tachometer assembly.

Figure 14:
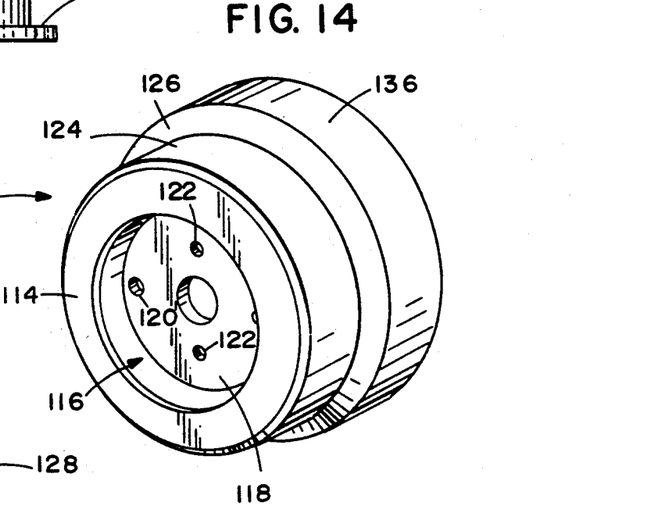
FIG. 14 is a perspective view of a hub in accordance with a third exemplary embodiment of the invention.
Figure 15:
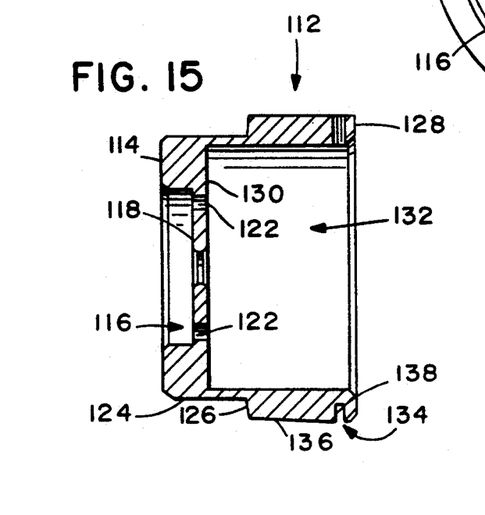
FIG. 15 is a side sectional view of the hub illustrated in FIG. 14.

In FIGS. 14 and 15, still another exemplary hub is shown which will accommodate any axial deviation in the predetermined length dimension from the motor casing end plate 16 to the shaft end face 22, i.e., axial run-out of the shaft relative to the end plate beyond the specified tolerance.

The annular hub 112 has an end face 114 provided with a central recess 116, sized to receive the end of the motor shaft 14. The end wall 118 at the back of the recess is provided with a pair of shaft mounting screw holes 120, and a pair of set screw adjustment holes 122.

The hub 112 includes a drum receiving peripheral surface 124 which includes an axial abutment or shoulder 126 which enables axial alignment of a drum (similar to drum 24) relative to the hub. The interior of the hub, from the rear end surface 128 to the interior wall 130 comprises a substantially open-ended cylindrical space 132. A groove 134 is formed in the larger diameter exterior peripheral surface 136 of the hub, adjacent the rear end surface 128. The groove, which need only extend a relatively short circumferential distance on the housing, serves as an alignment mechanism, i.e., the hub is aligned with the enclosure 26 by lining up the inner groove surface 138 with the end face of the enclosure. In this way, the drum and specifically tracks 58, 60 on the peripheral surface of the drum) will be properly aligned with the sensors 94, 96 in the sensor module 30. Any resulting slack between the shaft end face 22 and the recess surface 118 will be "taken up" by set screws (not shown) which are adapted to extend axially through holes 122 and engage the end face 22 of the shaft.

Figure 16:
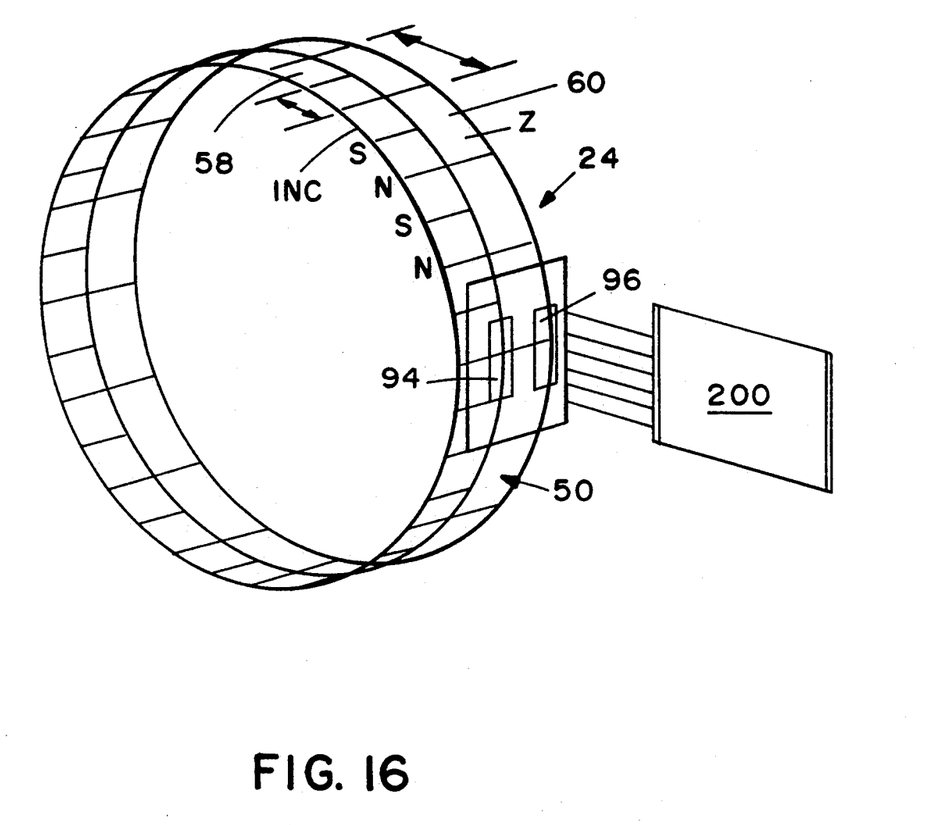
FIG. 16 is a schematic illustration of the magnetic tracks disposed on the preferred embodiment drum and the magneto-resistive sensor elements and associated signal sensing and conditioning circuitry provided by the preferred embodiment.

FIG. 16 schematically shows the magnetic "INC" track 58 and "25" track 60 disposed on the peripheral surface 50 of the preferred embodiment magnetic drum 24, and also shows the magneto-resistive sensor elements 94, 96 and associated signal sensing and conditioning circuitry 200 provided by the preferred embodiment of the present invention. As shown in FIG. 16, drum 24 is magnetized about its peripheral surface 50 (using conventional techniques to provide two distinct magnetic "tracks"—an "INC" track and a "Z" track.

The "Z" track 60 may also be termed an "index pulse track" since it is used to generate one output pulse per revolution of the drum. The "Z" track 60 thus provides information concerning the number of shaft revolutions; and also provides information concerning absolute shaft position (i.e., whenever a "Z" pulse is generated, the motor shaft is known to be at a particular absolute position relative to the magneto-resistive sensor module 30.

The "INC" track 58 may also be termed an "incremental magnetic track" since it is used to provide pulses indicating incremental shaft rotation. In the preferred embodiment, the "INC" track 58 is continuous about the peripheral surface 50 of the magnetic drum 24 and may encode many (e.g., 480, 512 or 600) pulses per revolution. The INC track 58 in the preferred embodiment comprises an alternating series of magnetic N and S poles magnetically imprinted into the drum periphery (as shown in FIG. 16) at a predetermined pitch (e.g., 750 microns in the preferred embodiment).

Three different magnetic drums may be used in conjunction with a common enclosure and sensor module in the preferred embodiment: a drum 24 (see FIG. 1) encoding 480 pulses per revolution; a drum 24' encoding 512 pulses per revolution; and a drum 24" encoding 600 pulses per revolution. These drums have slightly different diameters to insure that all three drums have the same magnetic pattern pitch (or spacing). Spacer plates of appropriate thickness (one shown at 140 in FIG. 1) are interposed between the sensor module 30 and the enclosure saddle surface 74 for the 512 and 600 pulse per revolution drums in order to maintain the radial gap between the sensors 94, 96 and the tracks 58, 60 on the drum periphery constant, i.e., the same as for the 480 pulse drum.

Figures 17, 17A:
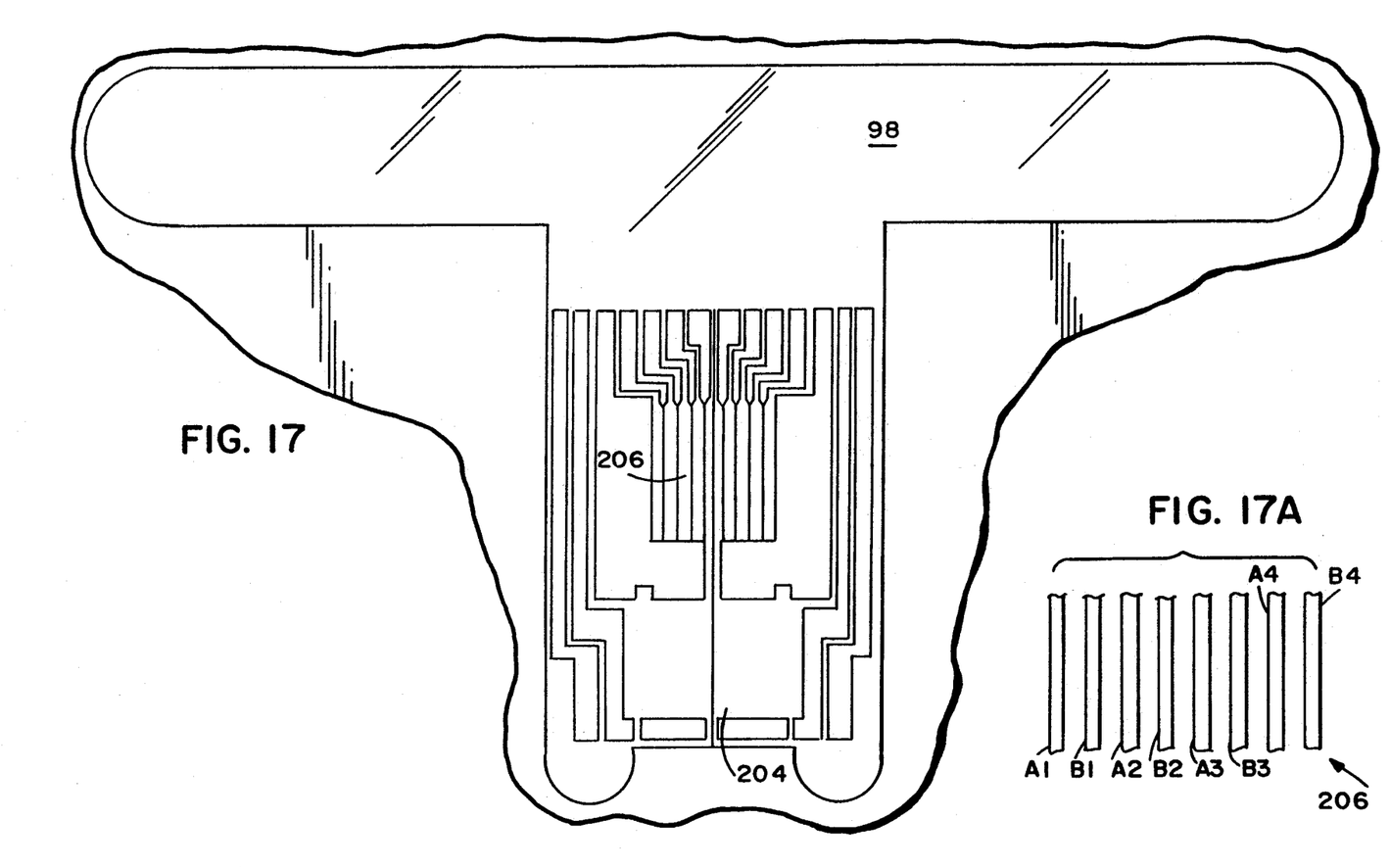
FIGS. 17 and 17A are plan views of the end of the sensor housing nearest the magnetic drum periphery and of the preferred incremental channel element array, respectively.

As shown in FIG. 17, (a plan view of end of sensor housing), each of the preferred embodiment sensors 94, 96 comprises magneto-resistive sensors. Thus, the "Z" sensor 94 comprises a magneto-resistive sensor 204, and the "INC" sensor 96 comprises a magneto-resistive sensor 206 in the preferred embodiment. These sensors 204, 206 comprise conventional interdigitated magneto-resistive sensor elements connected in conventional resistive electrical bridge array configurations so as to provide differential outputs. In the preferred embodiment, sensors 204, 206 are mounted on a common glass substrate and share power leads. Such magneto-resistive sensors and associated bridge circuit assemblies are available from Hitachi Corporation of Japan, for example. The conventional sensor elements and bridge arrays provide "A" and "B" quadrature electrical pulse output signals in response to magnetic patterns sensed by the "INC" sensor 206; and provide a "Z" electrical pulse output signal in response to magnetic patterns sensed by the "Z", sensor 204.

FIG. 17(a) shows the preferred embodiment "INC" sensor 206 in more detail. In the preferred embodiment, the "INC" sensor 206 comprises eight spaced apart interdigitated substantially linear magneto-resistive elements, with every other element corresponding to a common output (A or B) channel. Thus, elements A1, A2, A3 and A4 are connected to the four "legs" of a first conventional differential bridge circuit to provide the "A" sensor output signal; and elements B1, B2, B3 and B4 are connected to a further conventional different bridge circuit to provide the "B" sensor output signal. The "A" and "B" elements are disposed in alternating positions with respect to one another—that is, element B1 is disposed between elements A1 and A2, element B2 is disposed between elements A2 and A3, etc. All of the elements are disposed parallel to one another, and the self-alignment technique discussed above ensures that these elements are aligned and oriented appropriately (in three dimensions) with the INC magnetic track magnetically imprinted on the magnetic drum periphery. The function and operation of such conventional magneto-resistive sensors and associated bridge arrays is well known to those skilled in the art.

Sensor elements A1, A2, A3, and A4 are spaced with respect to one another at a pitch determined (in a conventional manner) by the pitch of the magnetic drum pattern. Similarly, sensor elements B1, B2, B3, and B4 are spaced with respect to one another at the same pitch as determined (in a conventional manner) by the magnetic drum pattern pitch. As already noted, since all three interchangeable drums used in the preferred embodiment have the same magnetic pattern pitch, the same sensor 206 can be used for any of the drums. The "B" elements are also positioned (in a conventional manner) such that they are translated by 90 electrical degrees relative to the "A" elements. Thus, the "A" bridge and the "B" bridge provide identical pulsed outputs as the magnetic drum rotates past sensor 206—but these outputs are electrically spaced from one another by 90 degrees (i.e., the outputs will 90 degrees out of phase with respect to one another and will thus be in "quadrature").

The "Z" sensor 204 is located a short distance from "INC" sensor 206, and the self-alignment structure ensures that the Z sensor is aligned with the "Z" magnetic drum track. As the magnetic drum rotates, the magneto-resistive sensor 204, 206 (and associated bridge array circuitry) provide "A" and "B" alternating pulse quadrature outputs (see FIG. 20); and also provide a "Z" pulse once per revolution of the magnetic drum. These "A", "B" and "Z" signals are provided to signal sensing and conditioning circuitry 200 for further processing.

Figure 18:
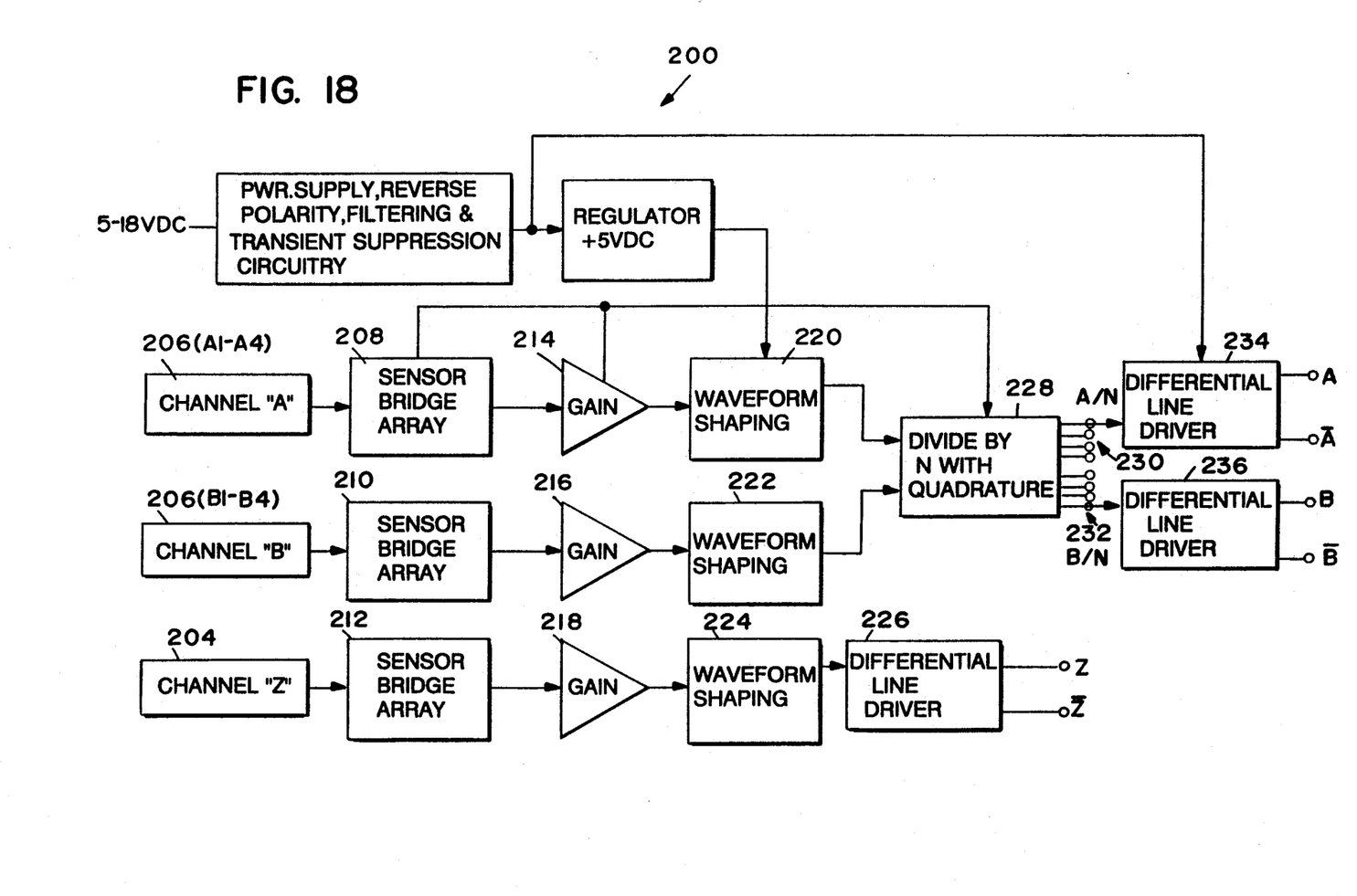
FIG. 18 is a schematic block diagram of exemplary signal sensing and conditioning circuitry provided by the preferred embodiment.

FIG. 18 is a schematic block diagram of exemplary signal sensing and conditioning circuitry 200 provided by the preferred embodiment. As shown in FIG. 18, the outputs of sensors 204, 206 are provided to conventional resistive sensor bridge arrays 208, 210, 212, respectively. These bridge arrays 208, 210, 212 are conventional in function and operation. Briefly, each of the bridge arrays 208, 210, 212 may include a resistive network having plural "legs" wherein an associated magneto-resistive sensor element is connected as part of each "leg." Electrical current flows through the plural legs, and a current summing node provides a differential voltage level which indicates the relative magnitudes of the currents flowing rough the legs. As the elements within the magneto-resistive sensors 204, 206 change in resistance due to sensed change in magnetic flux (i.e., as the magnetic drum 24 rotates past the sensor element), the currents flowing through the plural legs change—thereby causing a responsive change in the differential voltage level provided by the bridge. The bridge array thus generates a changing voltage output level responsive to the magnetic flux sensed by the associated magneto-resistive sensor elements. Such techniques are well known and well understood by those skilled in this art such that no further illustration or description is needed.

The outputs of bridge arrays 208, 210, 212 are provided to fixed-gain amplifiers 214, 216, 218 respectively. The amplified signals are provided to waveform shaping circuits 220, 222, 224, respectively. These shaping circuits 220, 222, 224 in the preferred embodiment comprise digital comparators which transform the signals into "square wave" type digital pulses. The output of the "Z" channel is provided by waveform shaping circuit 224 to a differential line driver 226, which drives pins of a connector (not shown).

The shaped "A" and "B" channel signals are provided by waveform shaping circuits 220, 222 to the input of a "divide by N" quadrature counter 228 in the preferred embodiment. Quadrature counter 228 scales the signals applied thereto to provide, in the preferred embodiment, divide-by-two, divide-by-four, and divide-by-eight scaled output signals in parallel for each of the "A" and "B" channels (while maintaining the quadrature relationship between the two channels). Jumpers 230, 232 are used in the preferred embodiment to program the scaling factor by selecting the desired divided output of quadrature counter 228. The A/N and B/N signals selected by jumpers 230, 232 respectively, are provided to the inputs of differential line drivers 234, 236 for driving associated pins of a connector (not shown).

Figure 19:
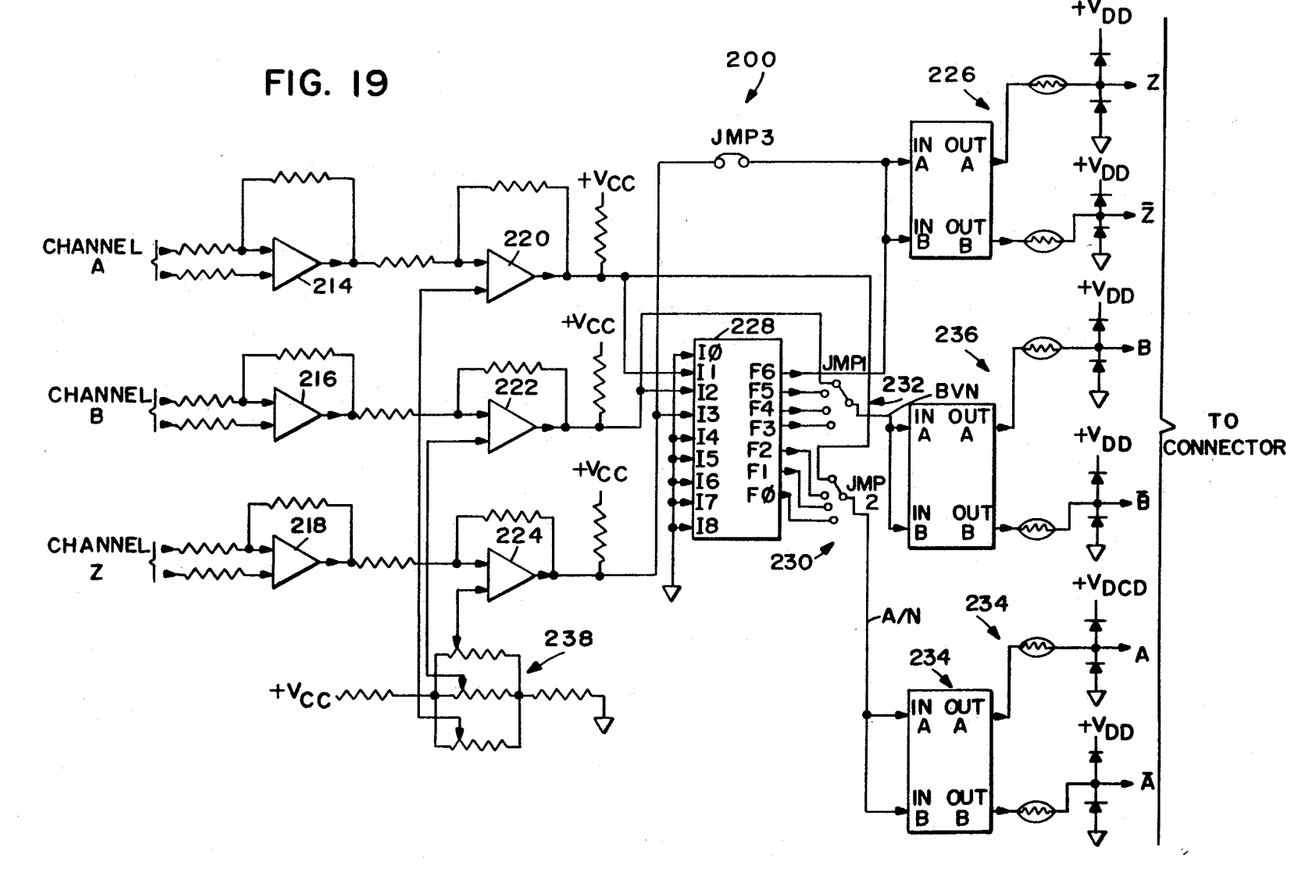
FIG. 19 as a more detailed schematic circuit diagram of the circuitry shown in FIG. 18.

FIG. 19 is a more detailed schematic circuit diagram of the circuitry shown in FIG. 18. As shown in FIG. 19, a resistive reference signal generating network 238 is used to provide adjustable reference voltages to each of comparators 220, 222, 224. Network 238 is independently adjustable for each comparator so as to provide compensation for variations in sensor element sensitivity, variations in the bridge arrays, etc. Quadrature counter 228 in the preferred embodiment comprises a standard off-the-shelf programmable logic device integrated circuit implementing an asynchronous state machine divide function. In the preferred embodiment, inputs I0 and I4-I8 are connected to logic level "0"; the channel A output from comparator 220 is connected to the I1 input; and channel B output from comparator 222 is connected to the I2 input; and the channel Z output of comparator 224 is connected to the I3 input. Quadrature counter 228 provides A/2, A/4 and A/8 outputs on output pins F2, F1 and F0, respectively; and provides B/2, B/4 and B/8 outputs on pins F5, F4, F3, respectively. The following state table and accompanying equations define the divide-by-2 logic function implemented by counter 228:

| qV | (B,A) | | | | (B,A) | | | |
|----|----|----|----|----|----|----|----|----|
|    | 00 | 01 | 11 | 10 | 00 | 01 | 11 | 10 |
| A  | A  | b  | c  | A  | 00 | 01 | 10 | 00 |
| B  | a  | B  | B  | d  | 00 | 01 | 01 | 11 |
| D  | D  | c  | b  | D  | 11 | 10 | 01 | 11 |
| C  | d  | C  | C  | a  | 11 | 10 | 10 | 00 |
|    |    | qV + 1 | | | | (Q1,Q0) | | |

Q1 = q1*/B + /q0*A*B + Q0*/A*B + q1*q0*/A + q1*/q0*A
Q0 = q0*B + q1*/A*/B + /q1*/B*A + q1*q0*/A + /q1*q0*A

In the preferred embodiment counter 228, such divide-by-2 logic is replicated so that there are three replications of the logic within counter 228 connected in series. The divide-by-2 output is obtained by taking the output of the first replication; the divide-by-4 output is obtained by taking the output of the second replication; and the divide-by-8 output is obtained by taking the output of the third replication.

Figure 20:
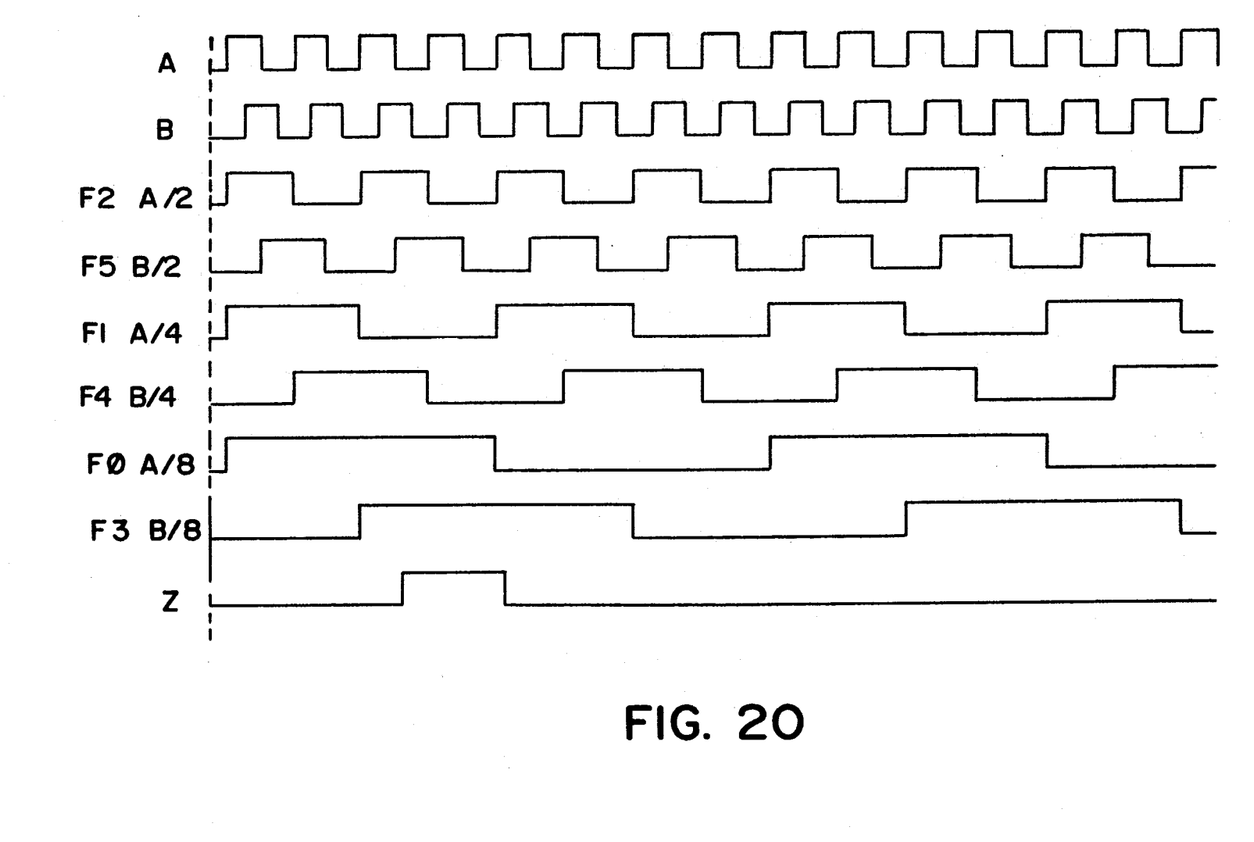
FIG. 20 is a graphical timing diagram showing exemplary signals provided by the FIG. 19 circuitry.

The FIG. 20 timing diagram shows the relationship between these various signals. Jumper 232 selects between output pins F5, F4, F3 and the direct (undivided) output of comparator 222 in order to provide the appropriately divided version of the "B" channel signal. Similarly, jumper 230 selects between output pins F2, F1, F0 and the direct (undivided) output of comparator 220 to provide the appropriately divided version of the "A" channel signal. In the preferred embodiment, jumpers 230, 232 are set at the factory to select outputs having a common divisor (e.g., A and B; A/2 and B/2; A/4 and B/4; or A/8 and B/8). Due to the quadrature nature of quadrature counter 228, the two selected outputs are always in quadrature (with "A" leading "B" by 90 degrees for clockwise rotation of the motor shaft). The selected outputs are passed on to differential line drivers 234, 236 (which provide isolation and sufficient line driving current).

Thus, the preferred embodiment is capable of providing the following programmable incremental pulse output rates by simply changing the jumper settings of jumpers 230, 232:

selectable between 480, 240, 120 or 60 pulses per revolution using a 480-pulse drum;
selectable between 512, 256, 128 and 64 pulses per revolution using a 512-pulse drum; and
selectable between 600, 300, 150 and 75 pulses per revolution using a 600-pulse drum.

It will be appreciated that sensor modules having different pre-set jumpers 230, 232 may be supplied with the tachometer assembly. In this way, the shaft may be monitored by a pair of sensor modules pre-set at different incremental pulse output rates, mounted on saddle surfaces 74, 76.

In another embodiment, the quadrature counter 228 may implement a conventional Exclusive OR function in response to the quadrature "A" and "B" input signals applied thereto so as to provide a conventional frequency doubling function (as is well known to those skilled in this art) so as to provide 960, 1024 or 1200 PPR for example.

The "Z" channel output produced by comparator 224 is coupled to differential line driver 236, and is applied applied to the "I3" input of quadrature counter 228 in the preferred embodiment, and the quadrature counter produces a delayed version of the "Z" signal (at pin "F6") in order to equalize the delay between the "A", "B" and Z" signals. If desired, the quadrature counter 228 may be programmed to implement the logic function $$Z_{out} = Z_{in} \text{ AND } A \text{ AND } B$$

if desired to provide additional control over the Z channel pulse width.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A tachometer for monitoring rotation of a machine shaft projecting from a housing having a standard NEMA end plate secured to the housing via a plurality of fasteners extending through aligned mounting holes in the end plate and the housing, the tachometer comprising:

a member adapted for attachment to the machine shaft externally of the housing and in proximity to the end plate of the housing, the member having at least one pattern applied thereon;

at least one sensor module including at least one sensing element for sensing rotation of said machine shaft via said at least one pattern and for providing responsive first and second electrical timing signals in quadrature, said sensor module including a mounting flange; and an enclosure including means for fastening said enclosure to the end plate of the housing using the aligned mounting holes in the end plate and the housing, said enclosure adapted to surround and enclose said member and at least partially enclose said shaft, said enclosure having a first machined external surface surrounding a first radial opening for engaging said mounting flange of said sensor module such that said sensor module projects through said radial opening and into said enclosure and wherein said member, said sensor module, and said enclosure including said machined external surface are sized and arranged so that upon assembly of said tachometer to said housing and without further adjustment, said at least one sensing element is accurately self-aligned axially and radially relative to said at least one pattern, with a predetermined radial gap between said sensing element and said at least one pattern.

2. The tachometer of claim 1 wherein said member is provided with a recess for receiving a free end of said shaft.

3. The tachometer of claim 2 wherein said member includes means for axially adjusting said member relative to the free end of the shaft.

4. The tachometer of claim 1 wherein said member is provided with a central aperture enabling said member to be slidably received over the shaft.

5. The tachometer of claim 1 wherein said enclosure comprises a generally cylindrical member having a first open end, a second partially closed end, and a substantially cylindrical surface extending axially between said first and second ends, said substantially cylindrical surface provided with a radially projecting portion which includes said first machined surface.

6. The tachometer of claim 1 wherein a second machined external surface is provided in diametrically opposed relationship to said first machined surface, said second machined surface surrounding a second radial opening, thereby enabling another sensor module to be mounted on said enclosure.

7. The tachometer of claim 1 wherein said sensor element comprises at least one magneto-resistive element, and said at least one pattern is defined magnetically on said member.

8. The tachometer of claim 1 and wherein said sensor module includes a programmable circuit connected to receive said first and second electrical signals, said programmable circuit scaling the timings of said timing signals by a scaling factor to provide scaled quadrature output signals, said programmable circuit including a scale selection circuit for setting the scale factor.

9. The tachometer of claim 1 and further comprising a plurality of members interchangeable with said member, each having at least one magnetic pattern scaled to a different pulse count, and wherein each member has a diameter which maintains a substantially constant pattern pitch for each different pulse count.

10. The tachometer of claim 9 wherein said predetermined radial gap comprises a nominal gap, and wherein interchangeable spacers are provided for selective insertion between said mounting flange and said machined surface to maintain said nominal gap constant for each member.

11. The tachometer of claim 9 and further comprising spacer means insertable between said sensor module and said first machined external surface for maintaining said radial gap constant for each member.

12. The tachometer of claim 1 wherein said predetermined radial gap is 0.020 in ±0.009 in.

13. A tachometer for monitoring the rotation of an output shaft of a motor enclosed within a housing having a standard NEMA end plate secured to the housing via a plurality of fasteners extending through aligned mounting holes in the end plate and the housing wherein the output shaft projects from the housing, the tachometer comprising:

a) a substantially cylindrical enclosure adapted to be secured to the end plate of the motor housing using the aligned mounting holes in the end plate and the housing, the enclosure having a radial center and a longitudinal axis which, when the enclosure is secured to the housing, are aligned with a longitudinal axis of the output shaft, said enclosure having at least one machined mounting surface in a wall portion thereof which projects radially from said enclosure; said mounting surface having an aperture therein open in a radial direction;

b) a sensor module including at least one sensor, said sensor module mountable on said machined mounting surface of said enclosure such that said module protrudes through said aperture with said sensor facing radially inwardly; and c) an annular drum having at least one pattern arranged on a circumferential surface thereof capable of being sensed by said sensor, said drum enclosed within said enclosure and operatively fixed on said output shaft for rotation therewith, wherein said at least one pattern is axially aligned with said sensor and radially spaced therefrom by a predetermined radial gap in a self-aligning manner and without further adjustment when said drum is fixed to said output shaft and said enclosure is mounted on said end plate in an operatively assembled relationship, so that upon rotation of said shaft and said drum, said sensor will sense rotation of said pattern.

14. The tachometer of claim 13 and including a hub adapted to receive said drum, wherein said hub is provided with a recess for receiving a free end of the output shaft.

15. The tachometer of claim 14 wherein said hub is provided with a central aperture enabling said hub and drum to be slidably received over the output shaft.

16. The tachometer of claim 14 wherein said hub includes means for axially adjusting said hub relative to the free end of the output shaft.

17. The tachometer of claim 13 wherein a pair of substantially identical mounting surfaces are provided in diametrically opposed relationship, thereby enabling a pair of substantially similar sensor modules to be mounted on said enclosure.

18. The tachometer of claim 17 wherein said sensor modules are interchangeable and replaceable without adjustment.

19. A tachometer for monitoring the rotation of an output shaft of a motor enclosed within a housing, wherein the output shaft projects from the housing, the tachometer comprising:
   a) an enclosure adapted to be secured to an end plate of the motor housing, the enclosure having a radial center and a longitudinal axis which, when the enclosure is secured to the housing, are aligned with a longitudinal axis of the output shaft, said enclosure having at least one mounting surface in a wall portion thereof, said mounting surface having an aperture therein open in a radial direction;
   b) a sensor module including at least one sensor, said sensor module mountable on said mounting surface of said enclosure such that said module protrudes through said aperture with said sensor facing radially inwardly; and
   c) an annular drum having at least one pattern arranged on a circumferential surface thereof capable of being sensed by said sensor, said drum operatively fixed on said output shaft, wherein said at least one pattern is aligned with said sensor and radially spaced therefrom by a predetermined radial gap when said drum is fixed to said output shaft and said enclosure is mounted on said end plate in an operatively assembled relationship, so that upon rotation of said shaft and said drum, said sensor will sense rotation of said pattern, and
   wherein said sensor module mounts said at least one sensor and a second sensor on a common substrate, said module including a programmable circuit connected to receive said first and second electrical signals, said programmable circuit scaling the timings of said timing signals by a scaling factor to provide scaled quadrature output signals, said programmable circuit including a scale selection circuit for setting the scale factor.

20. A tachometer for monitoring the rotation of an output shaft of a motor enclosed within a housing, wherein the output shaft projects from the housing, the tachometer comprising:
   a) an enclosure adapted to be secured to an end plate of the motor housing, the enclosure having a radial center and a longitudinal axis which, when the enclosure is secured to the housing, are aligned with a longitudinal axis of the output shaft, said enclosure having at least one mounting surface in a wall portion thereof, said mounting surface having an aperture therein open in a radial direction;
   b) a sensor module including at least one sensor, said sensor module mountable on said mounting surface of said enclosure such that said module protrudes through said aperture with said sensor facing radially inwardly; and
   c) an annular drum having at least one pattern arranged on a circumferential surface thereof capable of being sensed by said sensor, said drum operatively fixed on said output shaft, wherein said at least one pattern is aligned with said sensor and radially spaced therefrom by a predetermined radial gap when said drum is fixed to said output shaft and said enclosure is mounted on said end plate in an operatively assembled relationship, so that upon rotation of said shaft and said drum, said sensor will sense rotation of said pattern;
   and further comprising a plurality of annular drums interchangeable with said annular drum, each having at least one pattern scaled to a different pulse count, and wherein each drum has a diameter which maintains a constant pattern pitch for each different pulse count.

21. The tachometer of claim 20 wherein said predetermined radial gap is 0.020 in. to ±0.009 in., and wherein spacers are provided for insertion between said enclosure and said sensor module to maintain said gap constant for each drum.

22. The tachometer of claim 20 wherein adjustable spacer assemblies are provided for insertion between said enclosure and said sensor module to maintain said predetermined radial gap constant for each drum.

23. The tachometer of claim 20 wherein a fixed thickness spacer is provided for insertion between said enclosure and said sensor module to maintain said predetermined radial gap constant for each drum.

* * * * *